(12) United States Patent
Fickert

(10) Patent No.: US 11,248,731 B2
(45) Date of Patent: Feb. 15, 2022

(54) DEVICE AND METHOD FOR ASEPTIC PRESSURE RELIEF

(71) Applicant: KHS GmbH, Dortmund (DE)

(72) Inventor: Hilmar Fickert, Kriftel (DE)

(73) Assignee: KHS GmbH, Dortmund (DE)

( * ) Notice: Subject to any disclaimer, the term of this patent is extended or adjusted under 35 U.S.C. 154(b) by 41 days.

(21) Appl. No.: 16/651,744

(22) PCT Filed: Oct. 10, 2018

(86) PCT No.: PCT/EP2018/077614
§ 371 (c)(1),
(2) Date: Mar. 27, 2020

(87) PCT Pub. No.: WO2019/076700
PCT Pub. Date: Apr. 25, 2019

(65) Prior Publication Data
US 2020/0256496 A1   Aug. 13, 2020

(30) Foreign Application Priority Data

Oct. 19, 2017   (DE) .................... 10 2017 124 397.6

(51) Int. Cl.
*F16L 55/054*   (2006.01)
*B67C 3/00*   (2006.01)
(Continued)

(52) U.S. Cl.
CPC ............ *F16L 55/054* (2013.01); *B67C 3/007* (2013.01); *B67C 3/28* (2013.01); *B67C 3/12* (2013.01); *B67C 2003/228* (2013.01)

(58) Field of Classification Search
CPC ...... F16L 55/054; F16L 55/055; B67C 3/007; B67C 3/28; B67C 2003/228; B67C 3/12
(Continued)

(56) References Cited

U.S. PATENT DOCUMENTS 2,735,642 A * 2/1956 Norman ................ G05D 7/012
                                                                    251/5
3,103,234 A   9/1963 Washburn
(Continued)

FOREIGN PATENT DOCUMENTS

CN           1551940 A     12/2004
CN        202024020 U     11/2011
(Continued)

OTHER PUBLICATIONS

EP-1520986-A1 English Translation of Specification (Year: 2021).*

*Primary Examiner* — Timothy P. Kelly
*Assistant Examiner* — Stephanie A Shrieves
(74) *Attorney, Agent, or Firm* — Occhiuti & Rohlicek LLP

(57) ABSTRACT

A pressure-relief device includes a housing, a through-line, a feed-line connection, and a discharge-line connection. The housing comprises a housing wall that defines a chamber in an interior of the housing. The through-line, which extends, at least in sections, through the chamber and is configured for connection to the media line via the feed-line connection and the discharge-line connection, includes a through-wall that is formed, at least in part, from an elastically deformable material. A controller causes an inner pressure within the chamber to transition between a production pressure and a relief pressure that is less than the production pressure.

11 Claims, 5 Drawing Sheets

(51) Int. Cl.
*B67C 3/28* (2006.01)
*B67C 3/22* (2006.01)
*B67C 3/12* (2006.01)

(58) Field of Classification Search
USPC .......................................................... 137/14
See application file for complete search history.

(56) References Cited

U.S. PATENT DOCUMENTS

| | | | | |
|---|---|---|---|---|
| 3,874,417 | A * | 4/1975 | Clay | ............... F16L 55/054 |
| | | | | 138/30 |
| 4,934,399 | A * | 6/1990 | Cho | ............... G05D 16/2013 |
| | | | | 137/14 |
| 6,109,304 | A * | 8/2000 | Wolf | ............... F16L 55/054 |
| | | | | 138/30 |
| 6,305,421 | B1 * | 10/2001 | Ahrweiler | ............... D06B 1/08 |
| | | | | 118/50 |
| 6,568,416 | B2 * | 5/2003 | Tucker | ............... G05D 16/2053 |
| | | | | 137/14 |
| 7,306,006 | B1 * | 12/2007 | Cornell | ............... F15B 1/021 |
| | | | | 137/565.01 |
| 2011/0186757 | A1 * | 8/2011 | Kawamura | ........... B67C 3/2608 |
| | | | | 251/5 |
| 2012/0216912 | A1 * | 8/2012 | Pacetti | ................... A23G 9/283 |
| | | | | 141/18 |
| 2015/0209818 | A1 * | 7/2015 | deVilliers | ......... H01L 21/67051 |
| | | | | 137/500 |

FOREIGN PATENT DOCUMENTS

| | | | |
|---|---|---|---|
| CN | 202598010 U | 12/2012 | |
| CN | 107218470 A | 9/2017 | |
| DE | 1809356 | 4/1960 | |
| DE | 1910512 A1 | 10/1969 | |
| DE | 19723802 A1 | 12/1998 | |
| EP | 1520986 A1 * | 4/2005 | ............ F16L 55/054 |
| EP | 3020679 A1 | 5/2016 | |
| GB | 824365 A * | 11/1959 | ............ F16L 55/054 |

* cited by examiner

DEVICE AND METHOD FOR ASEPTIC PRESSURE RELIEF

RELATED APPLICATIONS

This is the national stage under § 371 of international application PCT/EP2018/077614, filed on Oct. 10, 2018, which claims the benefit of the Oct. 19, 2017 priority date of German application DE 10 2017 124 397.6.

FIELD OF INVENTION

The invention relates to a device and method for aseptic pressure relief in media lines.

BACKGROUND

In a container-treatment machine, it is common to convey various media along a media line. Examples of such media include cleaning media, operational media, and beverages or filling products. In some cases, the media line is quite long and holds a considerable volume. An example is the media line that connects beverage in a beverage cellar to a filling machine.

In some cases, it is necessary to stop the container-treatment machine. These stops are often as a result of some emergency, such as an operational fault. This emergency stop reduces the risk of immediate injury due to moving parts. Following the stop, repair personnel are called upon to rectify the problem.

A problem that arises is that the medium in the media line is often pressurized. This pressurized medium poses a danger to those who are attempting to repair the container-treatment machine. For example, when dismantling a valve, it is not impossible for a worker to be exposed to a stream of pressurized medium. This creates a risk of injury.

A known way to avoid this difficulty is to vent the excess pressure into the surrounding environment. However, this often results in exposing the medium to the environment. As a result, it is possible for the medium to be contaminated. This is particularly problematic when the container-treatment machine is a filling machine and the medium in question is the actual beverage that is to be filled into a container.

SUMMARY

The present invention provides a pressure-relief device that relieves pressure without a risk of contaminating the media.

In one aspect, the invention features a pressure-relief device having a housing with a housing wall, a through-line for a medium, with the through-line being connected to a media line and comprising a through-wall, and both a feed-line connection and a discharge-line connection for connection to the media line. This results in formation of a pressure chamber that defined by the housing wall. At least a section of the through-line extends through the pressure chamber in the interior of the housing.

At least a section of the through-line, namely the section that extends through the pressure chamber, is formed at least in part from a resiliently or elastically deformable material. The resulting pressure-relief device is formed in such a way that it becomes possible to adjust the pressure in the pressure chamber.

The pressure-relief device is thus an aseptic pressure relief device because it relieves pressure in the media line without exposing media to the external environment. The pressure-relief device is integrated into a media line, preferably into a beverage line, filling-material line, or product line, or installed or introduced into a circuit between two connection points in this media line.

The medium, which is preferably a beverage or other filling material or product, flows through the through-line along a flow path that extends along a flow direction. The flow direction is oriented from the feed line connection in the direction of the discharge line connection. The through-line thus effectively lengthens media line. The media preferably flows through the entire through-line in such a way that no dead spaces or similar areas can form. This ensures effective, reliable, and complete cleaning of the through-line or the flow path.

Because the through-line and the media line are integral with each other, there is no pressure difference between media in the media line and media in the through-line. Thus, both the media line and the through-line are at the same operational pressure.

The pressure chamber's inner pressure is adjustable. In addition, the through-line's through-wall is formed at least in part from an elastically deformable material, thus forming a flexible membrane. Reducing the pressure chamber's inner pressure below that prevailing in the media line or in the through-line distends the elastically deformable material of the through-wall. This increases the through-line's volume. The resulting expansion in volume relieves pressure in the media line. Adjusting the ratio between the pressure in the pressure chamber and the pressure in the media line adjusts the extent to which the volume expands, and hence the extent of the pressure relief. The pressure-relief device therefore creates additional space in the media line. This additional space is a "compensation space" or an "expansion space."

The pressure-relief device thus avoids relieving the media line to the external environment. Instead, the pressure-relief device forms a volume that is not in connection with the outside and uses this volume as a compensation or expansion volume to relieve pressure in the media line. The expansion volume is therefore an "aseptic expansion volume." In an emergency stop or during maintenance, this aseptic expansion volume relieves the media pressure or line pressure prevailing in the media line so that it falls safely from an operational or production pressure to a relief pressure. This reduces the risk of injury to repair personnel.

The pressure-relief device described herein avoids any connection to potentially dirty and/or germ-laden surroundings. Additionally, the pressure-relief device avoids creating dead volumes that would be prone to harboring contaminants. Thus, the additional "pressure relief volume" can be used without impairing the hygiene standard of a container-treatment system. This is of particular importance in a beverage-filling system.

In some embodiments, a pressure control that is connected to the pressure chamber adjusts the pressure within the pressure chamber so that it conforms to a predefined pressure. Among these are embodiments in which there are two predefined internal pressures. In such embodiments, the first of the two predefined internal pressures corresponds to the operational pressure prevailing in the media line and the second of the two internal pressures corresponds to a relief pressure that is lower than the operating pressure.

In some embodiments, there exists a pressure-tight connection between the through-line's through-wall and the housing.

In yet other embodiments, the feed line connection and the discharge line connection are configured such that, when the pressure-relief device is connected, the through-line makes a pressure tight connection with the media line using the feed-line connection and the discharge line connection. As a result, the medium flows into the through-line from the end that faces the feed line connection and out of the through-line at the end that faces the discharge-line connection.

In other embodiments, the elastically deformable material of the through-wall is gas-tight and fluid-tight. In a preferred embodiments, the elastically deformable material is an elastically deformable plastic or a corresponding elastically deformable natural material, such as a rubber material, and in particular, a vulcanized rubber. Among the useful embodiments are those in which the elastically deformable material is resistant to bursting as a result of exposure to a pressure that is consistent with the highest expected pressure that would be encountered during use.

In some embodiments, the elastically deformable material of the through-wall is resistant to being degraded by exposure to chemicals and/or to high temperatures. Among these are embodiments in which the material is resistant to degradation as a result of exposure to the most widely used cleaning and/or disinfection agents. For example, specified limit values for resistance to cleaning agents in container treatment systems should be maintained, in particular in filling machines.

In some embodiments, the controller for controlling internal pressure of the chamber includes a computer.

In yet other embodiments, the controller includes a sensor that measures the pressure in the chamber.

In yet other embodiments, an independent energy source provides energy for the control. A suitable independent energy source is a battery or a capacitor with associated circuitry. This is useful where emergency stoppage of a machine requires disconnection of the machine's energy source.

According to a further advantageous embodiment variant, provision is made for the controller to be configured such as, based on an actual value, to reduce and/or increase the pressure chamber inner pressure to a reference value. As reference values, depending on the operational state or depending on an intended change in the operational state, reference values can be understood, for example, to be a first pressure chamber inner pressure corresponding to the operational pressure or production pressure, or a second pressure chamber inner pressure corresponding to a lesser relieving pressure. According to whether it is intended that, in emergency stop situations, pressure should be relieved, or whether, after fault rectification, the container treatment machine should be run up to speed again, then, taking an existing actual value as the basis, the pressure chamber inner pressure is reduced or increased to the desired reference value.

Some embodiments set the relief pressure to be above some minimum pressure to avoid having dissolved gases, such as $CO_2$, come out of solution. This is particularly useful for carbonated beverages. In some embodiments, the relief pressure is no less than 0.5 bar and the production pressure is on the order of 6 bar.

The pressure relief device is preferably adjusted or adjustable to the media line in relation to the most widely differing parameters. For example, the pressure relief device can be adjusted to different rated widths of the media lines, and/or to the properties of the media being conveyed. For example, a diameter and a total volume of the media lines, and an inner volume of the housing or a volume of the pressure chamber can be matched to one another. Likewise, the expansion volume of the through-line, and, in particular, also a performance capacity [cubic meters of compressed air per hour] of the pressure control can be matched to the media line and to the media being conveyed. In particular, the pressure-relief device is configured in such a way that both a rapid pressure reduction and a rapid pressure build-up are possible.

Some embodiments maintain a minimum overpressure in the media line. This overpressure reliably discourages the ingress of germs or other forms of contamination.

In other embodiments, the controller causes imposition of compressed air on the pressure chamber. Among these are embodiments in which there exists an independent supply of compressed air. This permits adjustment of internal pressure with minimal power use.

In another aspect, the invention features a method for relieving pressure in a media line using a pressure-relief device having a pressure-relief device that is integral with a media line. The pressure-relief device comprises a housing with a housing wall, and a pressure chamber. The housing wall defines the pressure chamber within the housing's interior. The device also includes a through-line that connects to the media line by a feed-line connection and a discharge-line connection. The pressure-relief device features a through-wall that extends into the pressure chamber. The method includes relieving media pressure by reducing an inner pressure that prevails in the pressure chamber, thereby permitting the through-wall to expand, thus increasing the through-line's volume.

In some embodiments, a pressure-control unit, or "controller," adjusts the pressure chamber's inner pressure. Among these are embodiments that include adjusting the less of the two pressures.

As used herein, the expressions "essentially" or "approximately" signify deviations from an exact value in each case by ±10%, preferably by ±5%, and/or deviations that are not of significance for function.

Further embodiments, advantages, and possible applications of the invention can also be derived from the following description of exemplary embodiments and from the figures. All the features described and/or represented as images are in principle the object of the invention, taken individually or in any desired combination, regardless of their combination in the claims or reference to them.

The content of the claims is also expressly made a constituent part of the description.

BRIEF DESCRIPTION OF THE DRAWINGS

These and other features of the invention will be apparent from the following detailed description and the accompanying figures in which.

Identical reference numbers are used for those components that are the same or that have the same effect. To avoid clutter, only those references numbers that are useful for understanding the discussion of a particular figure are shown in that figure.

DETAILED DESCRIPTION

Figure 1:
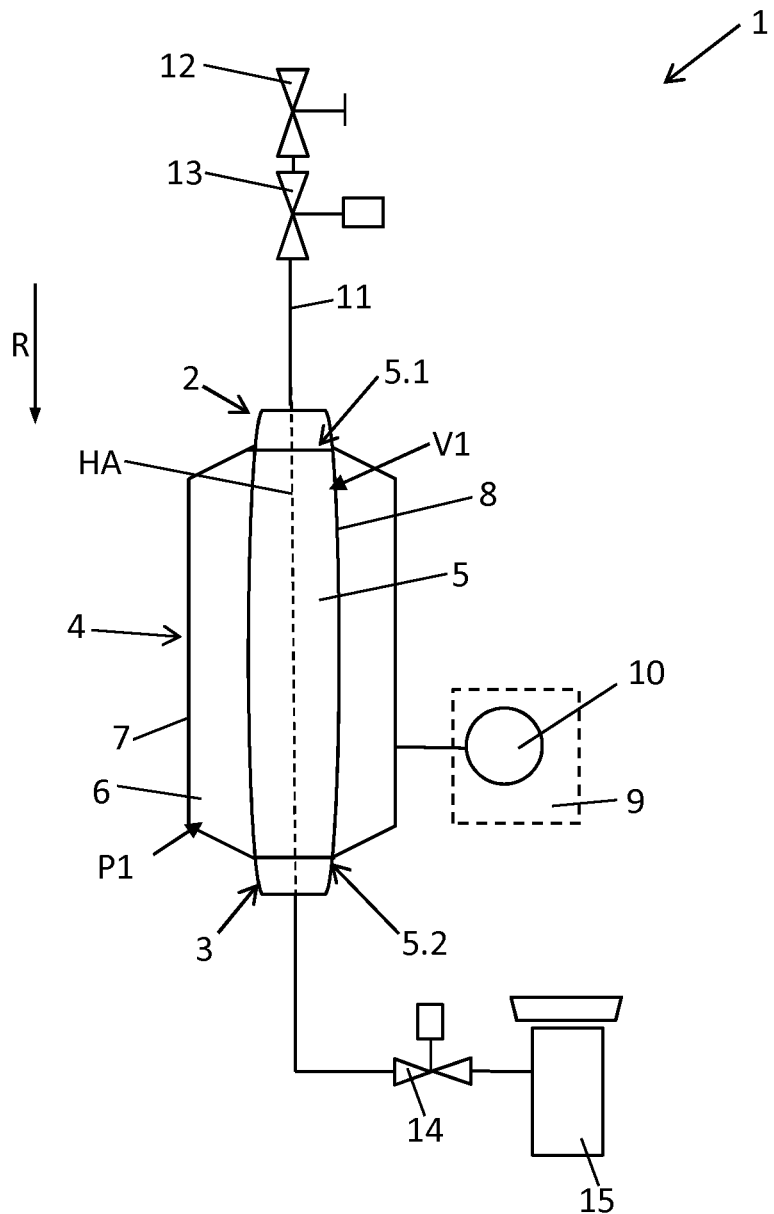
FIG. 1 shows a pressure-relief device in a first operational state, in which it connects to a media line at production pressure.

FIG. 1 shows a pressure-relief device 1 for relieving pressure in a media line 11 in a container-treatment system, and in particular, in a filling machine.

The configuration shown in FIG. 1 represents the pressure-relief device 1 in a first state. This first state corresponds to normal operation. During normal operation, the media line 11 typically carries product under pressure. This pressure, which is referred to herein as "production pressure," conveys product, such as a beverage, to from a storage container, such as a beverage cellar, to a filling head 15 or to a filling valve 14. The pressure prevailing in the media line 11 is thus the production pressure.

The pressure-relief device 1 extends along a main axis HA. A feed-line connection 2 and a discharge-line connection 3 connect the pressure-relief device 1 to the media line 11. As a result, the pressure-relief device 1 is an intermediate piece in a fluid path that includes the media line 11.

The media flows in a flow direction R that defines an upstream and downstream direction. As shown in FIG. 1, the pressure-relief device 1, which extends along the flow direction R, is downstream of a shutoff valve 13 and upstream of a filling valve 14. This shutoff valve 13 interrupts a connection to the beverage cellar.

The pressure-relief device comprises a housing 4 that includes a housing wall 7. The housing wall 7 defines a pressure chamber 6 within the housing's interior. A through-line 5, through which the medium flows, connects to the media line 11. A through-wall 8 that extends along the housing's interior surrounds the through-line 5.

The through-line 5, which is made of an elastically deformable material, extends through the pressure chamber 6 along the direction of the main axis HA between the feed connection 2 and the discharge-line connection 3. The feed connection 2 and the discharge-line connection together connect the through-line 5 to the media line 11. As a result, the medium flows in the flow direction R between first and second ends 5.1, 5.2 of the through-line 5.

During the first state, a controller 10 maintains a predefined first pressure P1 within the pressure chamber 6. This first pressure P1 matches the pressure prevailing in the line 11 and, as a result, the pressure in the through-line 5. At the first pressure P1, the through wall 8 does not extend significantly. Thus, at the first pressure P1, the through wall 8 defines an essentially cylindrical volume V1, as shown in FIGS. 1 and 3.

Figure 3:
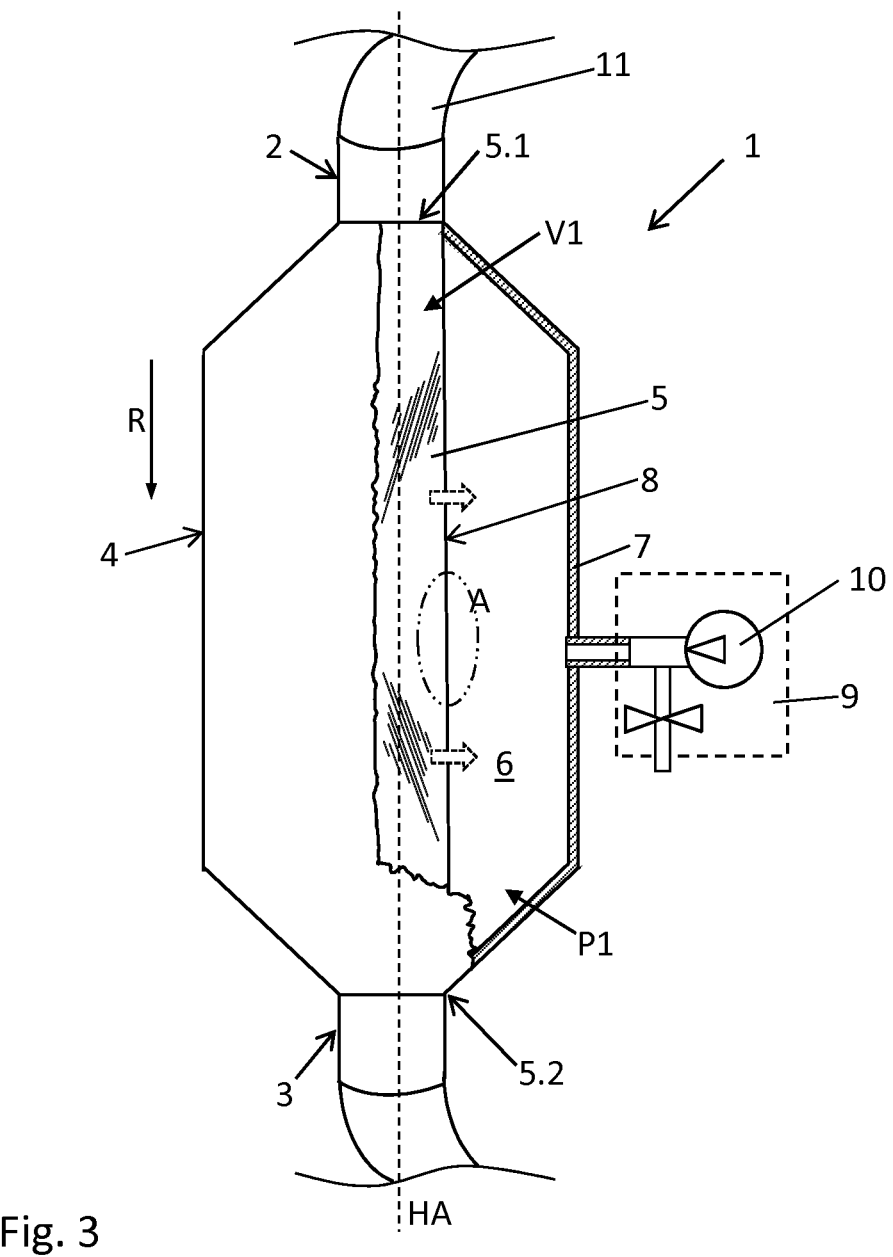
FIG. 3 shows a cut-away view of a housing wall of the pressure-relief device of FIG. 1 in the first operational state under production pressure.

During the second state, the controller 10 maintains a predefined second pressure P2 in a second state, shown in FIG. 3. This second pressure P2 is lower than the first pressure P1. Since the second pressure P2 is lower, it is useful to refer to it as a "relief pressure."

Upon occurrence of a fault, closing either the automatic shutoff valve 13 or the manual shutoff valve 12 interrupts a connection between the media line 11 and the media source.

At the same time, or soon thereafter, the controller 10 establishes the second pressure P2 in the pressure chamber 6.

Figure 2:
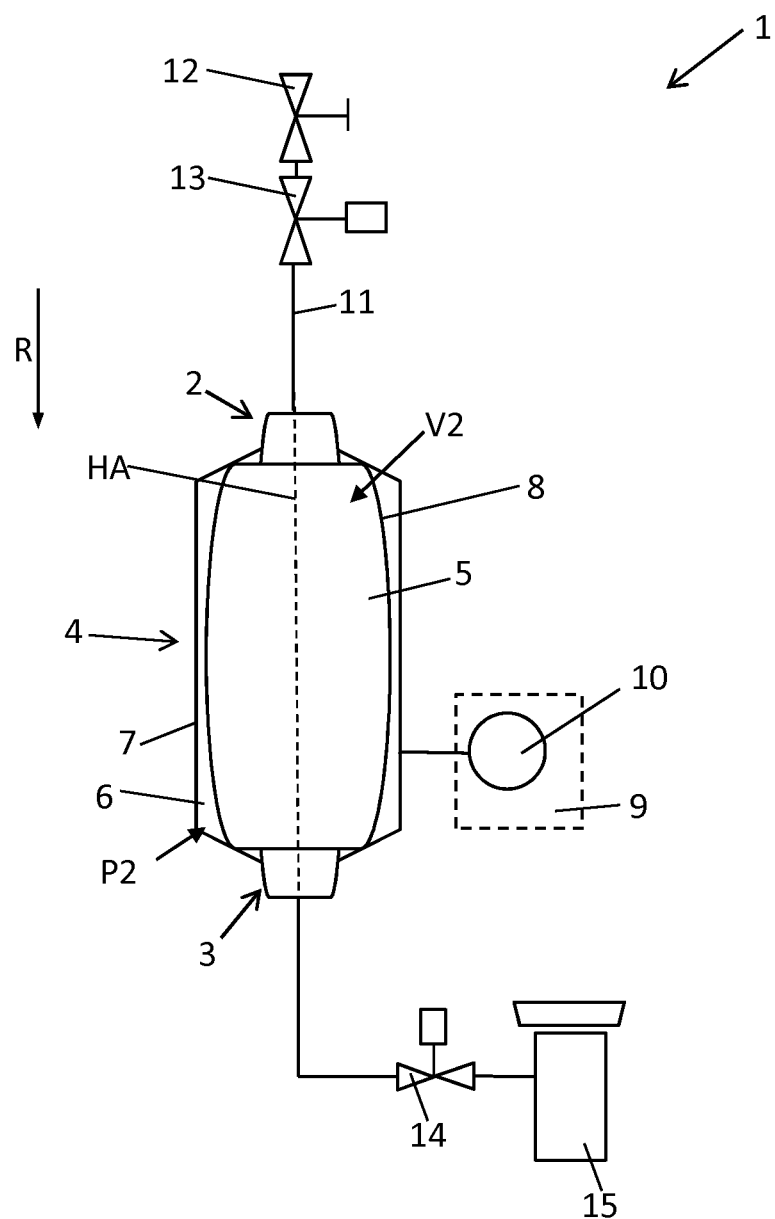
FIG. 2 shows the pressure-relief device of FIG. 1 in a second operational state under relief pressure.

Since the second pressure P2 is lower than the first pressure P1, the through-wall 8 expands, as shown in FIG. 2. In doing so the through-wall 8 defines a second volume V2 that exceeds the first volume V1. This second volume V2 defines a "relief volume.".

Figure 5A:
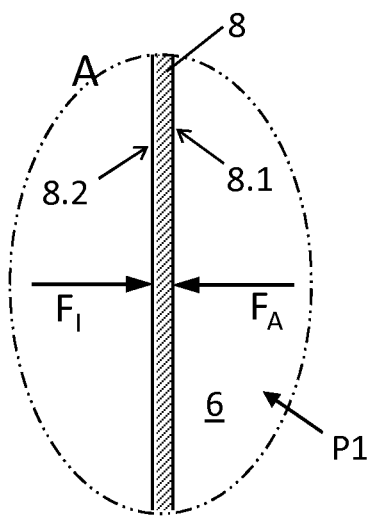
FIG. 5a is a section in the direction of a main axis of a section of a through-wall in the first operating state under production pressure.
Figure 5B:
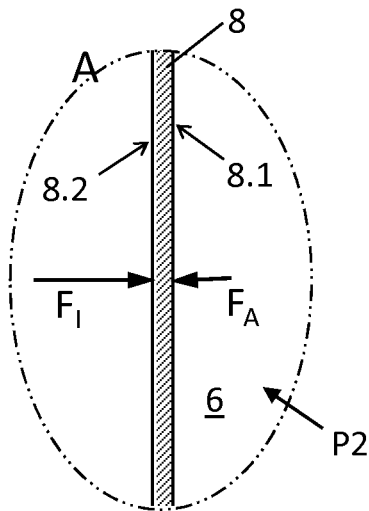
FIG. 5b shows the section of FIG. 5a during adjustment of the relief pressure.

The extent of the change in the through-wall's volume, and hence the change in the through-line's volume, is a function of the difference between the production pressure and the relief pressure. The through-wall's expansion depends on a ratio of a first force FA, which acts on a first side 8.1 of the wall 8 and a second force FI, which acts on a second side 8.2 of the wall 8, as shown in FIGS. 5a and 5b. The first side 8.1 faces the pressure chamber 6. Accordingly, controller 10 can adjust the first force FA by adjusting the pressure in the pressure chamber 6.

Given the values of the compressibility of the medium flowing through the media line 11 and the through-line 5, a small expansion of the through-line 5 causes a substantial fall in pressure. Thus, any risk associated with excessive pressure in the medium flowing through the media line 11 and the through-line 5 can be mitigated by suitable adjustment of the second pressure P2.

The compressibility of a volume V of liquid is given by a relationship between a differential change dV in its volume and the accompanying differential change dP in pressure, namely $dV/(V*dP)$. For water, this is on the order of 0.5 per gigapascal. Thus, even a small change in the through-line's volume as a result of elastic deformation of the through-wall 8 is sufficient to reduce the pressure of a water-based medium.

Figure 4:
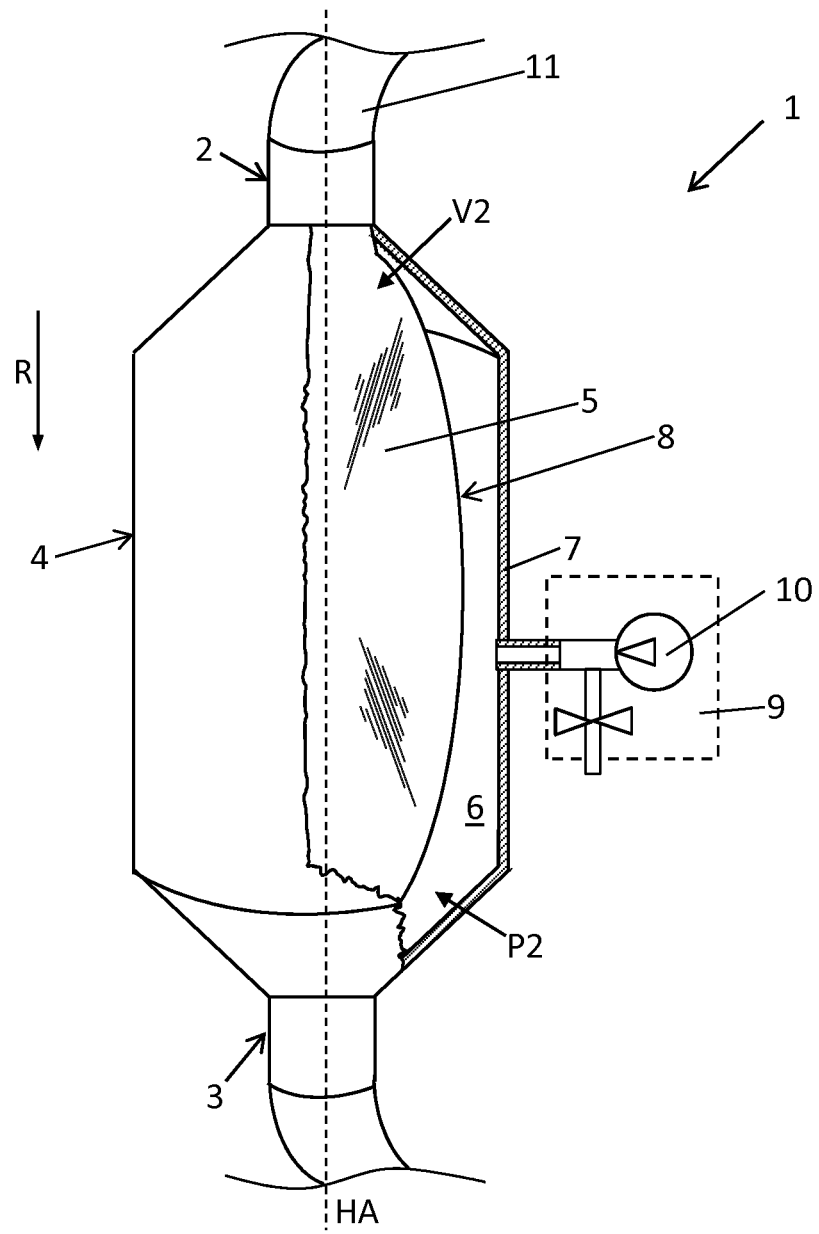
FIG. 4 shows a cut-away view of a housing wall of the pressure-relief device of FIG. 3 in the second operational state under relief pressure.

FIGS. 3 and 4 show the pressure-relief device 1 with the housing wall 7 having been partially sectioned along the axis HA.

In FIG. 3, the pressure-relief device 1 is operating in the first state, in which the pressure is the production pressure. In this state, the diameter of the through-line 5 conforms to that of the media line 11. This results in unhindered flow through the through-line 5.

In FIG. 4, the pressure-relief device 1 is operating in the second state, in which the pressure is the relief pressure.

The through-wall 8 of the through-line 5 is produced entirely from an elastically deformable material. In a preferred embodiment, the elastically deformable material is resistant to temperature as well as to cleaning and disinfection agents that are conventionally used for container-treatment systems. In one embodiment, the resistance of the through-wall 8 to various agents is summarized in the following table:

By way of example, specific data is listed in the following table with regard to the resistance of the through-wall 8 in relation to different cleaning and disinfection agents:

| Cleaning agent | Concentration | Temp. | Daily contact time |
|---|---|---|---|
| Alkaline cleaning using NaOH | up to 3% | 85° C. | 45 minutes |
| Combined cleaning and disinfection using NaOH and Na hydrochloride (pH = 12) | up to 3% | 80° C. | 45 minutes |
| Acidic cleaning using $H_3PO_4$ (phosphoric and nitric acid) | up to 1.5% | 30° C. | 30 minutes |

-continued

| Cleaning agent | Concentration | Temp. | Daily contact time |
| --- | --- | --- | --- |
| Disinfection using Na hydrochloride (pH = 9) | up to 300 ppm active chlorine | 30° C. | 45 minutes |
| Disinfection with acetic acid (PES) with chloride content of the operational water of up to 300 ppm | up to 0.3% | 30° C. | 16 hours |
| Disinfection using iodophor with chloride content of the operational water of up to 300 ppm | up to 100 ppm active iodine | 30° C. | 16 hours |
| Hot water | — | 95° C. | 45 minutes |
| Steam | — | 130° C. | Sustained contact |
| Ozone | 600 mf/m$^3$ air | 0-30° C. | — |

In the first state, the first pressure P1, which prevails in the pressure chamber 6, is set equal to the production pressure. As a result, the two forces balance and the through-wall 8 of the through-line 5 does not expand. Accordingly, the through-line 5 remains essentially cylindrical with a first first volume V1.

FIGS. 5a and 5b show the forces acting on a section of through wall 8 identified in FIG. 4 by the elliptical broken line A in FIG. 3.

FIG. 5a shows the first state. In this first state, the forces FI and FA are balanced. The ratio of the forces, FI/FA, is therefore approximately unity. As a result, the through-wall 8 experiences no net force. Therefore, it does not flex outward.

FIG. 5b shows the second state, in which the second pressure has been reduced to the second pressure P2. In this second state, the forces are unbalanced, with FI being greater than FA. As a result, the through-wall expands.

As shown in FIG. 4, in the second state, the lower second pressure P2 allows the first pressure P1 to cause the through-line 5 to camber outward towards the pressure chamber 6 so that its belly protrudes into the pressure chamber 6. This results in an increased volume V2. In a typical embodiment, the through-line 5 adopts the shape of an ellipsoid having a major axis along the main axis HA.

A difference between the first and second volumes results in an expansion volume. The expansion volume permits the medium contained in the through-line 5 to be distributed over a larger volume. This reduces its pressure. As a result, it is possible to efficiently reduce the pressure in the media line 11.

The controller 10 adjusts the pressure chamber's inner pressure. In a preferred embodiment, the controller 10 includes a computer 9.

The controller 10 is also able to significantly reduce the pressure within the pressure chamber 6, thus allowing the elastically deformable through-wall 8 to expand to an even greater extent. In an extreme case, the through-wall 8 expands enough to be partially in contact with an inner side of the housing's wall 7. This permits an even larger expansion volume for greater pressure relief.

The relief pressure is preferably greater than zero. In a preferred embodiment, the relief pressure is selected such that the pressure within the medium remains above some desired minimum value and that gas dissolved in the medium remains dissolved. This is particularly important for a carbonated beverage, in which the dissolved gas is typically carbon dioxide.

Upon completion of maintenance or repair, the container-treatment machine is brought back into service. Doing so includes having the control unit 10 raise the pressure in the pressure chamber 6 back to the first pressure P1. As a result, the medium is brought back to production pressure.

The invention has been described heretofore on the basis of exemplary embodiments. It is understood that numerous modifications and derivations are possible, without thereby departing from the inventive concept underlying the invention.

The invention claimed is:

1. An apparatus comprising a pressure-relief device for relieving pressure in a media line and a pressure-control unit for controlling said pressure-relief device, said pressure-relief device comprising a housing, a through-line, a feed-line connection, and a discharge-line connection, wherein said housing comprises a housing wall that defines a chamber in an interior of said housing, wherein said through-line, which extends, at least in sections, through said chamber and is configured for connection to said media line via said feed-line connection and said discharge-line connection, includes a through-wall that is formed, at least in part, from an elastically deformable material, and wherein said pressure-control unit causes an inner pressure within said chamber to transition between a production pressure and a relief pressure that is less than said production pressure, wherein said pressure-control unit is configured to cause said inner pressure to transition from an actual value to a reference value.

2. The apparatus of claim 1, wherein said through-wall connects to said housing via a pressure-tight connection.

3. The apparatus of claim 1, wherein said feed-line connection and said discharge-line connection are configured such that, when said pressure-relief device is connected to said media line, said feed-line connection and said discharge-line connection connect to said media line in a pressure-tight manner and wherein medium flows into said through-line from a first end, which faces said feed-line connection, to a second end, which faces said discharge-line connection.

4. The apparatus of claim 1, wherein said through-wall is formed completely from said elastically deformable material.

5. The apparatus of claim 1, wherein said elastically deformable material of said through-wall is fluid-tight.

6. The apparatus of claim 1, wherein said elastically deformable material is resistant to chemical reaction with substances that are passed through said media line.

7. The apparatus of claim 1, wherein said elastically deformable material is resistant to temperatures of substances that are passed through said media line.

8. The apparatus of claim 1, wherein said pressure-control unit comprises a computer.

9. The apparatus of claim 1, wherein said pressure-control unit comprises a sensor that detects inner pressure of said chamber.

10. The apparatus of claim 1, wherein said pressure-control unit is configured to impose compressed air on said chamber.

11. A method comprising relieving pressure in a media line, wherein relieving pressure comprises using a pressure-relief device that has been integrated into said media line, said pressure-relief device comprising a housing having a housing wall that defines a chamber within an interior of said housing and a through-line that connects to said media line via a feed-line connection and a discharge-line connection, said through-line having a through-wall that extends, at least in sections, through said chamber and that comprises an elastically deformable material, wherein said method comprises causing an inner pressure within said chamber to transition to a relief pressure that is less than a production pressure, thereby causing said through-line to expand in volume, wherein causing said inner pressure to transition comprises causing said inner pressure to transition from an actual value to a reference value.

* * * * *